//UNITED STATES PATENT OFFICE.

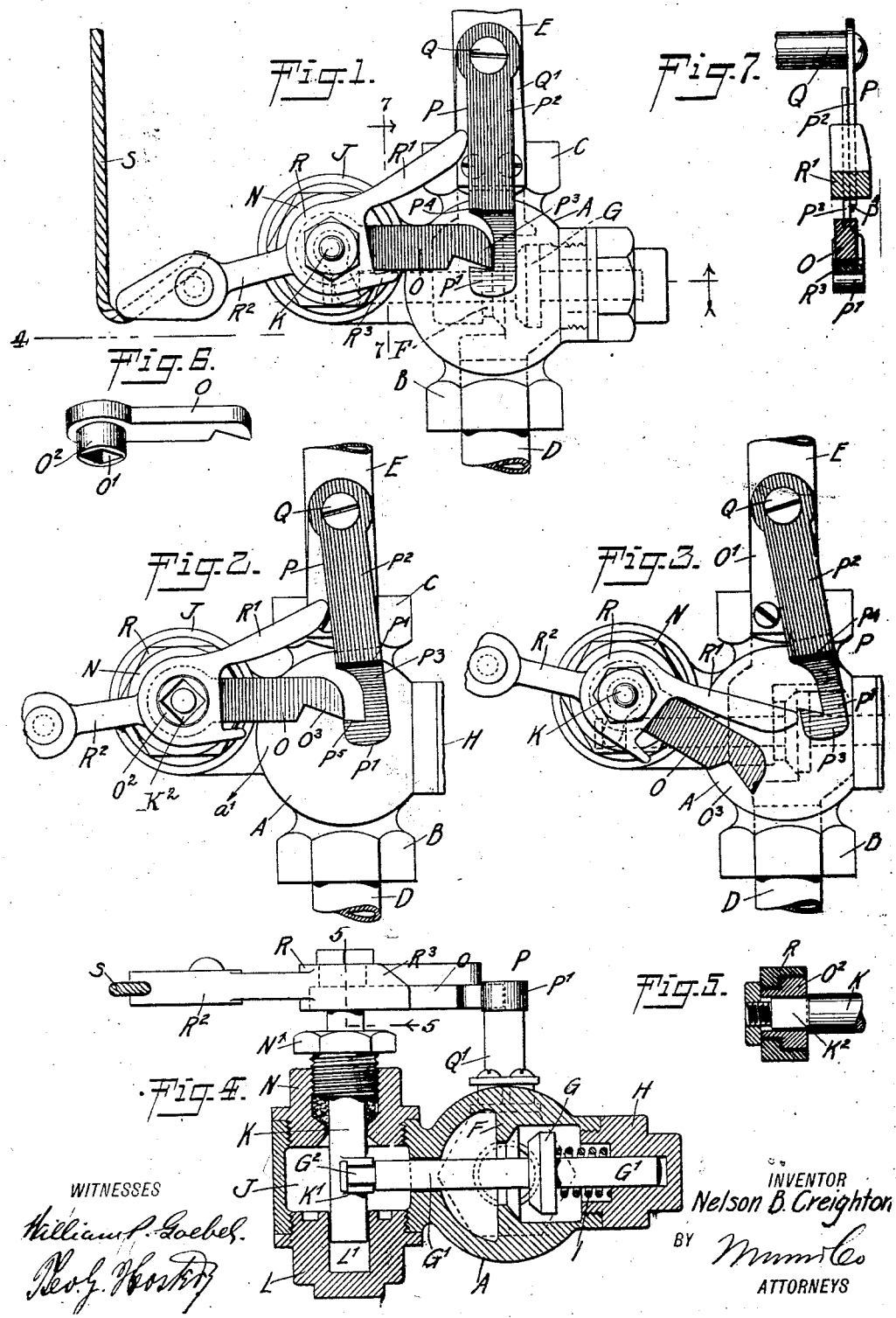

NELSON B. CREIGHTON, OF NEW YORK, N. Y.

VALVE.

1,131,475.

Specification of Letters Patent. Patented Mar. 9, 1915.

Application filed July 21, 1914. Serial No. 852,196.

*To all whom it may concern:*

Be it known that I, NELSON B. CREIGHTON, a citizen of the United States, and a resident of the city of New York, Elmhurst, borough of Queens, in the county of Queens and State of New York, have invented a new and Improved Valve, of which the following is a full, clear, and exact description.

The invention relates to valves, such as shown and described in the application for Letters Patent of the United States, Serial No. 809,262, filed by me on December 29, 1913.

The object of the present invention is to provide a new and improved valve which is normally held in open position for the passage of gas, liquid or other fluid and is arranged to permit closing from a distant point and to close automatically in case of a fire with the view to stop the flow of fluid through the valve. In order to accomplish the desired result use is made of an actuating device for a spring-pressed valve disk to normally hold the latter in open position, the said device having an arm controlling the valve disk and adapted to engage a pivoted retaining hook, and a manually controlled lever adapted to engage the pivoted retaining hook, and to move the said hook out of engagement with the said arm to release the valve disk.

A practical embodiment of the invention is represented in the accompanying drawings forming a part of this specification, in which similar characters of reference indicate corresponding parts in all the views.

Figure 1 is a side elevation of the valve with the valve disk in normal position; Fig. 2 is a like view of the same with the parts in partly releasing position; Fig. 3 is a similar view of the same with the parts in full released position and the valve disk closed; Fig. 4 is an inverted sectional plan view of the valve on the line 4—4 of Fig. 1; Fig. 5 is an enlarged cross section of the rock shaft, the arm secured thereon and the lever mounted to rock loosely on the said shaft, the section being on the line 5—5 of Fig. 4; Fig. 6 is a perspective view of the arm on the rock shaft for engagement with the releasing hook; and Fig. 7 is a cross section of part of the valve-operating mechanism.

The valve body A of the valve is provided with an inlet B and and outlet C connected with the pipes D and E respectively, and intermediate the said inlet B and the said outlet C is arranged a valve seat F on which is adapted to be seated a valve disk G having a stem G' mounted to slide at one end in a cap H screwing on one side of the valve body A, as plainly shown in Fig. 4. A spring I is employed on the valve stem G' and rests with one end on the cap H while the other end presses against one side of the valve disk G to move the latter onto the seat F whenever a force against the valve disk is released, as hereinafter more fully explained. The other end $G^2$ of the valve stem G' extends into a chamber J formed on the valve body A, and into the said chamber J extends a rock shaft K provided with a fork K' adapted to engage the reduced end $G^2$ of the valve stem G' to press the latter outward and likewise the valve disk G to hold the latter normally off its seat, as plainly indicated in Fig. 4. One end of the chamber J is closed by a screw plug L and the other end is closed by a screw plug N adapted to be interchanged with the screw plug L so as to permit the use of the plugs L and N on either side of the chamber J. The screw plug L is provided with a bearing L' for the inner end of the rock shaft K, and the screw plug N is provided with a stuffing box N' in which is journaled the other outer end of the rock shaft K. The rock shaft K is provided near its outer end with a polygonal portion $K^2$ (see Fig. 5) onto which fits the correspondingly shaped bore O' in the cup $O^2$ of an arm O adapted to engage with its free end the head P' of a hook P fulcrumed on a pivot Q held on a bracket Q' attached to the valve body A. The hook P is made in two sections $P^2$, $P^3$ connected with each other by solder $P^4$ fusible at a temperature higher than ordinary temperature, the section $P^2$ being mounted to swing on the pivot Q while the section $P^3$ is provided with head P' engaged by the arm O. It will be seen that when the valve is heated by a fire that breaks out in the building or from any other cause then the solder $P^4$ melts. The retaining hook section $P^3$ becomes detached from the section $P^2$ thus releasing the hook O to allow the valve disk G to move to its seat F by the action of its spring I with a view to automatically close the valve.

The hook P is adapted to be engaged at the side toward the arm O by an arm R' of a lever R fulcrumed loosely on the hub O² of the arm O, as plainly indicated in Fig. 5. To the outer end R² of the lever R is secured one end of a cable, rope or other connection S extending to a distant place to permit the operator at said distant place to impart a swinging motion to the lever R with a view to cause the end R' to swing the hook P out of engagement with the arm O thus releasing the latter to allow the valve G to move to its seat by the action of the spring I with a view to close the valve. The arm R' overlies the arm O so that in case the spring I should be broken and a pull is exerted then the arm R' first disengages the hook P from the arm O and then the arm R' engages the arm O and swings the same around in the direction of the arrow a' (see Fig. 2) to rock the shaft K with a view to draw the valve G to its seat F to close the valve. The lever R is further provided with a lug R³ adapted to engage the under side of the arm O with a view to swing the arm O upward into engagement with the head P' of the hook P whenever it is desired to set the valve in open position.

By reference to the drawings it will be noticed that the contacting faces O³ and P⁵ of the arm O and the hook P are undercut to prevent accidental disengagement of the hook P and arm O, at the same time, however, allowing of swinging the hook P out of engagement with the arm O when actuating the lever R from a distant point, as above explained.

It is understood that when the several parts are in the position shown in Figs. 1 and 4, the spring I is pressed and the valve disk G is held open by the action of the fork K' on the rock shaft K locked in place by the arm O engaging the retaining hook P. Now when the hook P is subjected to heat and the solder P⁴ melts then the section P³ becomes disconnected from the section P² and consequently the arm O is released to allow this spring I to move the valve disk G to its seat F thus closing the valve. A similar result is obtained when an operator at a distance exerts a pull on the connection S, it being understood that in this case the hook P is swung out of engagement with the arm O by the action of the lever R.

Having thus described my invention, I claim as new and desire to secure by Letters Patent:

1. A valve comprising a valve body having an inlet, an outlet and a valve seat intermediate the inlet and outlet, a spring-pressed valve disk adapted to be seated on the said seat, means including an arm for holding the valve disk normally off its seat, a movable retaining hook made in sections connected with each other by fusible solder to hold the sections together under ordinary temperature but disconnecting the sections at a high temperature, the said hook normally being engaged by the said arm, and a manually controlled lever adapted to engage the said hook to move the hook out of engagement with the said arm to release the latter and allow the valve disk to move to its seat and close the valve.

2. A valve, comprising a valve body having an inlet, an outlet and a valve seat intermediate the inlet and outlet, a spring-pressed valve disk adapted to be seated on the said seat, means including an arm for holding the valve disk normally off its seat, a movable retaining hook made in sections connected with each other by fusible solder to hold the sections together under ordinary temperature but disconnecting the sections at a high temperature, the said hook being pivoted and being engaged by the said arm to hold the valve disk normally in open position, and a manually controlled lever having a pushing member adapted to engage the said hook to swing the latter out of engagement with the said arm to release the latter and allow the valve disk to move into closed position.

3. A valve, comprising a valve body having an inlet, an outlet and a valve seat intermediate the inlet and outlet, a spring-pressed valve disk adapted to be seated on the said seat, means including an arm for holding the valve disk normally off its seat, a movable retaining hook made in sections connected with each other by fusible solder to hold the sections together under ordinary temperature but disconnecting the sections at a high temperature, the said hook being pivoted and being engaged by the said arm to hold the valve disk normally in open position, and a manually controlled lever having a pushing member adapted to engage the said hook to swing the latter out of engagement with the said arm, to release the latter and allow the valve disk to move into closed position, the said pushing member being adapted to engage the said arm after the latter is released by the hook.

4. A valve, comprising a valve body having an inlet, an outlet and a valve seat intermediate the inlet and outlet, a spring-pressed valve disk adapted to be seated on the said seat, means including an arm for holding the valve disk normally off its seat, a movable retaining hook made in sections connected with each other by fusible solder to hold the sections together under ordinary temperature but disconnecting the sections at a high temperature, the said hook being pivoted and being engaged by the said arm to hold the valve disk normally in open position, and a manually controlled lever having a pushing member adapted to engage the said hook to swing the latter out of engagement with the said arm to release the latter and allow the valve disk to move into closed position, the said lever having a lug adapted to engage the said arm to swing the latter into engagement with the hook and open the valve.

5. A valve, comprising a valve body having an inlet and an outlet and a valve seat intermediate the said inlet and outlet, a spring-pressed valve disk adapted to be seated on the said seat, a rock shaft having an operative connection with the said valve disk to normally hold the valve disk off its seat and against the tension of its spring, an arm attached to the said rock shaft, a hook pivoted on the said valve body and adapted to be engaged by the said arm to hold the valve disk normally in open position, the said hook being made in sections connected with each other by fusible solder to hold the sections together under ordinary temperature and to disconnect the sections at a higher temperature, a lever mounted to swing loosely on the said rock shaft as its fulcrum, the said lever having one end adapted to engage the said hook and extending over the said arm, and a flexible connection connected with the other end of the said lever and leading to a distant point.

6. A valve, comprising a valve body having an inlet and an outlet and a valve seat intermediate the said inlet and outlet, a spring-pressed valve disk adapted to be seated on the said seat, a rock shaft having an operative connection with the said valve disk to normally hold the valve disk off its seat against the tension of its spring, an arm attached to the said rock shaft, a hook pivoted on the said valve body and adapted to be engaged by the said arm to hold the valve disk manually in open position, the said hook being made in sections connected with each other by fusible solder to hold the sections together under ordinary temperature and to disconnect the sections at a higher temperature, a lever mounted to swing loosely on the said rock shaft as its fulcrum, the said lever having one end adapted to engage the said hook and extending over the said arm, the said lever having a lug adapted to engage the said arm to swing the latter into engagement with the said hook, and a flexible connection connected with the other end of the said lever and leading to a distant point.

In testimony whereof I have signed my name to this specification in the presence of two subscribing witnesses.

NELSON B. CREIGHTON.

Witnesses:
  GEORGE H. WEBB,
  CHAS. BUSHNELL.